Patented Oct. 3, 1939

2,175,109

UNITED STATES PATENT OFFICE 2,175,109

INSECTICIDE

Houston V. Claborn and Lloyd E. Smith, Washington, D. C.; dedicated to the free use of the People of the United States of America No Drawing. Application July 22, 1937,
Serial No. 155,022

1 Claim. (Cl. 167—30)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

We hereby dedicate the invention herein described to the free use of the people of the United States of America to take effect on the granting of a patent to us.

Our invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which is relatively non-toxic to man and domestic animals when taken by mouth and which can be used in place of lead arsenate and other arsenicals for destroying insects without leaving a harmful residue on fruits and vegetables.

We have found that the class of organic compounds known as fluorene and derivatives thereof are effective in killing many species of insects whether applied externally or internally; that these organic compounds may be sprayed or dusted upon delicate vegetation without injuring it; that these materials are even more effective than lead arsenate and other commonly used insecticides and that they are relatively non-toxic to warm-blooded animals. This class of compounds may be represented by the general formula—

in which R and R' are aromatic nuclei in each of which 2 adjacent carbon atoms take part in forming a five membered carbon ring and $R^2$ may be 2 hydrogen atoms; one hydrogen and one hydroxyl group; or oxygen.

Some of the hydrogen atoms normally attached to R and R' may be substituted or replaced by alkyl, cycloalkyl, aryl, heterocyclic nuclei, or halogen, nitro, amino, hydroxy, alkoxy or aryloxy groups. If $R^2$ is hydrogen and hydroxyl or oxygen the hydroxyl and oxygen may be further substituted by the types of organic radicals which react with these groups respectively.

These products may be reduced to impalpable powder by grinding and applied to vegetation either dry as a dust or wet as a spray. The products being soluble in refined mineral oils, may be applied as a component of an oil emulsion spray. When applied as a spray in water it is desirable to incorporate an effective wetting agent such as one of the so-called sulphonated oils. These products may also be applied by dissolving them in acetone and pouring the acetone into water whereupon a fine colloidal precipitate is formed. This may be applied directly to plants or may be combined with a suitable wetting agent and then sprayed.

As examples of the toxicity of this class of compounds, it was found that—

(1) 9-chlorofluorene at a concentration of 4 pounds per hundred gallons of water gave approximately 50% control of the codling moth.

(2) That 9-fluorenone at a concentration of 10 parts per million of water gave a 91.3% kill of mosquito larvae.

(3) That 2-fluoryl amine at a concentration of 40 parts per million of water gave a 99% kill of mosquito larvae.

Other compounds in this class which have proved to be toxic are for example; fluorene, 9,9-dichlorofluorene, 9-fluorenol, 2-fluorenol, 2-nitro-9-fluorenone, and 9-fluorenol acetate. It is to be understood that these compounds are named specifically only as examples and that it is apparent to anyone skilled in the art that a great many derivatives and/or substitution products are possible and fall within the class of organic compounds covered by this application.

Having thus described our invention, we claim:

An insecticide containing as its essential active ingredient 9-chlorofluorene.

HOUSTON V. CLABORN.
LLOYD E. SMITH.